(12) United States Patent
Kim et al.

(10) Patent No.: US 10,255,182 B2
(45) Date of Patent: Apr. 9, 2019

(54) COMPUTING APPARATUS AND METHOD FOR CACHE MANAGEMENT

(71) Applicant: Samsung Electronics Co., Ltd., Suwon-si, Gyeonggi-do (KR)

(72) Inventors: Namhyung Kim, Seoul (KR); Junwhan Ahn, Seoul (KR); Kiyoung Choi, Seoul (KR); Woong Seo, Hwaseong-si (KR)

(73) Assignees: SAMSUNG ELECTRONICS CO., LTD., Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 263 days.

(21) Appl. No.: 15/019,368

(22) Filed: Feb. 9, 2016

(65) Prior Publication Data

US 2016/0232093 A1 Aug. 11, 2016

(30) Foreign Application Priority Data

Feb. 11, 2015 (KR) .................. 10-2015-0021107
Jan. 29, 2016 (KR) .................. 10-2016-0011116

(51) Int. Cl.
G06F 12/00 (2006.01)
G06F 12/0811 (2016.01)
G06F 12/0862 (2016.01)

(52) U.S. Cl.
CPC ...... *G06F 12/0811* (2013.01); *G06F 12/0862* (2013.01); *G06F 2212/604* (2013.01); *G06F 2212/6026* (2013.01)

(58) Field of Classification Search
USPC ........................................ 711/105
See application file for complete search history.

(56) References Cited

U.S. PATENT DOCUMENTS

| 8,645,612 | B2 | 2/2014 | Kunimatsu et al. |
| 2006/0212659 | A1* | 9/2006 | Dieffenderfer ...... G06F 12/0833 711/141 |
| 2010/0057984 | A1* | 3/2010 | Chen ................... G06F 12/0804 711/113 |
| 2012/0191900 | A1 | 7/2012 | Kunimatsu et al. |
| 2014/0006717 | A1 | 1/2014 | Steely, Jr. et al. |
| 2014/0258628 | A1 | 9/2014 | Shivashankaraiah et al. |

FOREIGN PATENT DOCUMENTS

| JP | 2011-186559 A | 9/2011 |
| JP | 2014-153969 A | 8/2014 |
| KR | 10-2012-0012377 A | 2/2012 |

OTHER PUBLICATIONS

Wum Carole-Jean, et al. "SHiP: Signature-Based Hit Predictor for High Performance Caching." *Proceedings of the 44th Annual IEEE/ACM International Symposium on Microarchitecture.* ACM, 2011. (12 pages, in English).

* cited by examiner

*Primary Examiner* — Jae U Yu
(74) *Attorney, Agent, or Firm* — Harness, Dickey & Pierce, P.L.C.

(57) ABSTRACT

A method of managing a cache includes storing first data of an upper level cache in a lower level cache, predicting a reuse distance level of second data having a same signature as the first data based on access information about the first data, and storing the second data in one of the lower level cache and a main memory based on the predicted reuse distance level of the second data.

23 Claims, 13 Drawing Sheets

COMPUTING APPARATUS AND METHOD FOR CACHE MANAGEMENT

CROSS-REFERENCE TO RELATED APPLICATION(S)

This application claims the benefit under 35 USC 119(a) of Korean Patent Application Nos. 10-2015-0021107 filed on Feb. 11, 2015, and 10-2016-0011116 filed on Jan. 29, 2016, in the Korean Intellectual Property Office, the entire disclosures of which are incorporated herein by reference for all purposes.

BACKGROUND

1. Field

This application relates to methods of managing a cache and computing apparatuses for performing the methods.

2. Description of Related Art

In general, a cache is a small memory component mounted in or near a central processing unit (CPU) to allow fast access to a large-capacity main memory. Since a processing speed of a CPU is generally higher than a memory access speed, a cache that has a relatively small capacity but is fast has a direct influence on the performance of a processor. Since there is a tendency that many memory accesses frequently occur near a predetermined location, if frequently used data is copied into a high-speed cache, an average memory access time may be reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of managing a cache includes storing first data of an upper level cache in a lower level cache; predicting a reuse distance level of second data having a same signature as the first data based on access information about the first data; and storing the second data in one of the lower level cache and a main memory based on the predicted reuse distance level of the second data.

The lower level cache may include a volatile memory and a non-volatile memory; and the storing of the second data may include storing the second data in one of the volatile memory, the non-volatile memory, and the main memory based on the predicted reuse distance level of the second data.

The lower level cache may be an exclusive cache that does not share any data with the upper level cache.

The predicting of the reuse distance level of the second data may include determining a reuse distance of the first data based on the access information about the first data; comparing the determined reuse distance of the first data with a predetermined threshold value; updating a counter value corresponding to a signature of the first data based on a result of the comparing; and predicting the reuse distance level of the second data based on the updated counter value.

The storing of the first data may include storing the first data in a sampling set corresponding to a portion of the lower level cache; and the determining of a reuse distance of the first data may include determining a reuse distance of the first data based on a number of times at least one piece of data stored in the sampling set is accessed.

The storing of the first data may include storing the first data in a sampling set corresponding to a portion of the lower level cache; and the predicting may include storing the access information about the first data.

The lower level cache may include a non-volatile memory, and not include a volatile memory.

The non-volatile memory may be a spin-transfer torque random-access memory (STT-RAM).

In another general aspect, a non-transitory computer-readable storage medium stores instructions for causing computing hardware to perform the method described above.

In another general aspect, a computing apparatus includes an upper level cache; a lower level cache configured to store first data evicted from the upper level cache; a main memory; and a predictor configured to predict a reuse distance level of second data having a same signature as the first data based on access information about the first data, and determine whether to store the second data in the lower level cache or a main memory based on the predicted reuse distance level of the second data.

The lower level cache may include a volatile memory and a non-volatile memory; and the predictor may be further configured to determine whether to store the second data in the volatile memory, the non-volatile memory, or the main memory based on the predicted reuse distance level of the second data.

The lower level cache may be an exclusive cache that does not share any data with the upper level cache.

The predictor may include a sampler configured to determine a reuse distance of the first data based on the access information about the first data; and the predictor may be further configured to compare the determined reuse distance of the first data with a predetermined threshold value, update a counter value corresponding to a signature of the first data based on a result of the comparing, and predict the reuse distance level of the second data based on the updated counter value.

The lower level cache may be further configured to store the first data in a sampling set corresponding to a portion of the lower level cache; and the sampler may be further configured to determine a reuse distance of the first data based on a number of times at least one piece of data stored in the sampling set is accessed.

The lower level cache may be further configured to store the first data in a sampling set corresponding to a portion of the lower level cache; and the predictor may be further configured to store the access information about the first data.

The lower level cache may include a non-volatile memory, and not include a volatile memory.

The non-volatile memory may be a spin-transfer torque random-access memory (STT-RAM).

In another general aspect, a method of managing a cache includes storing first data evicted from an upper level cache in a lower level cache including a non-volatile memory; predicting a reuse distance level of second data evicted from the upper level cache based on access information about the first data; and storing the second data in one of the lower level cache and a main memory based on the predicted reuse distance level of the second data.

The lower level cache may further include a volatile memory; and the storing of the second data may include storing the second data in one of the volatile memory, the non-volatile memory, and the main memory based on the predicted reuse distance level of the second data.

The lower level cache may be an exclusive cache that does not share any data with the upper level cache.

The first data and the second data may have a same signature.

The non-volatile memory may be a spin-transfer torque random-access memory (STT-RAM).

In another general aspect, a processor includes an upper level cache configured to store data; and a lower level cache including a non-volatile memory; and the lower level cache is an exclusive cache that does not share any data with the upper level cache.

The processor may further include a predictor configured to determine whether to store data evicted from the upper level cache in the lower level cache or the main memory.

The predictor may include a sampler configured to determine a reuse distance of data stored in the lower level cache based on access information about the data stored in the lower level cache.

The predictor may further include a counter; and the predictor may be further configured to compare the determined reuse distance of the data stored in the lower level cache with a predetermined threshold value, update the counter based on a result of the comparing, predict a reuse distance level of the data evicted from the upper level cache based on the updated counter in response to the data evicted from the upper level cache and the data stored in the lower level cache having a same signature, and determine whether to store the data evicted from the upper level cache in the lower level cache or the main memory based on the predicted reuse distance level of the data evicted from the upper level cache.

The non-volatile memory may be a spin-transfer torque random-access memory (STT-RAM).

The lower level cache may further include a volatile memory.

In another general aspect, a computing apparatus includes an upper level cache; a lower level cache; and a predictor configured to predict a likelihood that data evicted from the upper level cache and having a same signature as data stored in the lower level cache will be reused based on access information about the data stored in the lower level cache, and determine whether to store the data evicted from the upper level cache in the lower level cache or a main memory based on the predicted likelihood that the data evicted from the upper level cache will be reused.

The lower level cache may include volatile memory and non-volatile memory; and the predictor may be further configured to determine whether to store the data evicted from the upper level cache in the volatile memory, the non-volatile memory, or the main memory based on the predicted likelihood that the data evicted from the upper level cache will be reused.

The predictor may be further configured to determine to store the data evicted from the upper level cache in the lower level cache in response to the predicted likelihood being equal to or greater than a predetermined threshold, and to store the data evicted from the upper level cache in the main memory in response to the predicted likelihood being less than the predetermined threshold.

The predictor may be further configured to predict the likelihood that the data evicted from the upper level cache will be reused by predicting a reuse distance level of the data evicted from the upper level cached based on the access information about the data stored in the lower level cache.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In examples described in this application, a reuse distance of data is predicted, and data having a relatively small reuse distance is stored in a lower level cache, while data having a relatively great reuse distance is stored in a main memory so that a standby power of the lower level cache is reduced.

In addition, by storing data having a relatively great reuse distance in the main memory instead of a non-volatile memory in the lower level cache, write energy consumed by the non-volatile memory may be reduced.

In this application, the terms "comprise" and "include" are not to be construed as necessarily including various elements or operations described in the specification, but are to be construed so that some of the elements or the operations described in the specification may not be included, or additional elements or operation may be further included.

In the present description, terms including ordinal numbers such as "first," "second," etc., may be used to describe various elements, but the elements should not be defined by these terms. The terms may be used merely for distinguishing one element from another element, or for convenience of description.

Hereinafter, examples will be described in detail with reference to the attached drawings.

Figure 1:
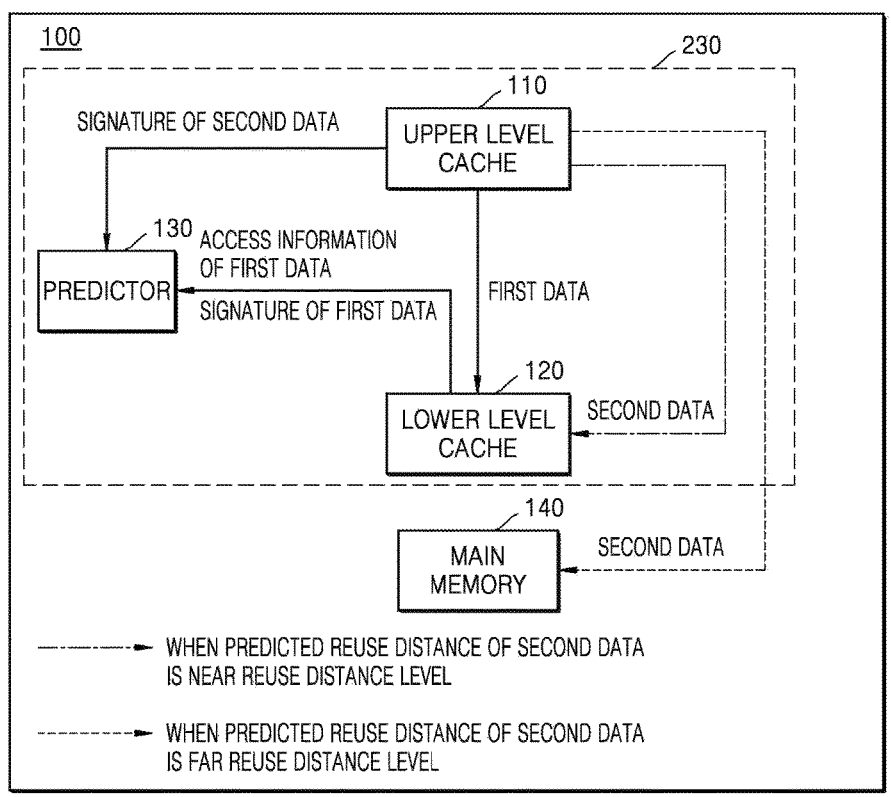
FIG. 1 illustrates an example of a computing apparatus.

FIG. 1 illustrates an example of a computing apparatus 100.

The computing apparatus 100 includes a processor 230 including an upper level cache 110, a lower level cache 120, a predictor 130, and a main memory 140. Only elements of the computing apparatus 100 that are related to this example are illustrated in FIG. 1. It will be apparent to one of ordinary skill in the art that the computing apparatus 100 may also include general-purpose elements in addition to the elements illustrated in FIG. 1.

The upper level cache 110 stores data and a signature of the data. A signature is information according to which data may be classified. Data having the same signature may be accessed in a similar access pattern. In one example, a signature may be a program counter (PC) value of data, a memory region of data, or an instruction sequence history of data. The PC value is an address value of an instruction of a processor to access data previously stored in the upper level cache 110. If a PC value of data has 32 bits, the upper level cache 110 may store the entire PC value or a portion of the PC value (for example, the 13 least significant bits of the PC value) as a signature of the data. The upper level cache 110 may store the signature of the data in an additional field of a tag.

Figure 2:
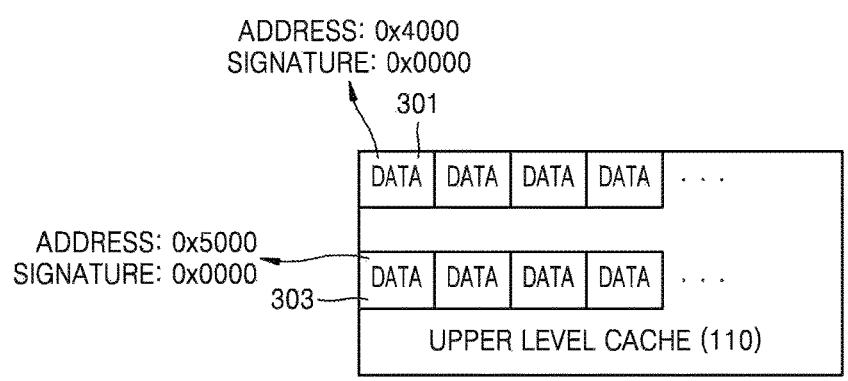
FIG. 2 illustrates an example of data and a signature stored in an upper level cache.

FIG. 2 illustrates an example of data and a signature stored in an upper level cache.

Referring to FIG. 2, the upper level cache 110 stores first data 301 having a memory address value of 0x4000 and second data 303 having a memory address value of 0x5000. Also, the upper level cache 110 stores, as a signature of the first data 301, 0x0000, which is the 13 least significant bits of a PC value of 0x10000, which is an address value of an instruction accessing the first data 301. Also, the upper level cache 110 stores, as a signature of the second data 303, 0x0000, which is the 13 least significant bits of a PC value of 0x20000, which is an address value of an instruction accessing the second data 303. That is, the first data 301 and the second data 303 have the same signature 0x0000. Accordingly, although the first data 301 and the second data 303 have different PC values, they may be regarded as having similar access patterns. Although an example in which the 13 least significant bits of the PC value are stored as a signature is described with reference to FIG. 2, the entire PC value or a different number of least significant bits of the PC value may be stored and used as a signature.

In the lower level cache 120 of FIG. 1, first data evicted from the upper level cache 110 is stored. Also, a cache block evicted from the upper level cache 110 may be stored in the lower level cache 120. A cache block may be a base unit of a data amount stored in a cache, and may include various pieces of data. Thus, for convenience of description, the expression 'data' used herein is deemed to include the meaning of a 'cache block'.

The lower level cache 120 may include a non-volatile memory. For example, the lower level cache 120 may include only a non-volatile memory, or may be a hybrid cache including a volatile memory and a non-volatile memory. Examples of the non-volatile memories included in the lower level cache 120 include a spin-transfer torque random-access memory (STT-RAM), a ferroelectric random-access memory (FeRAM), a magnetic random-access memory (MRAM), and a phase-change memory (PCM). A STT-RAM operating at a high speed and a low power consumption consumes less energy (dissipates less energy) than other non-volatile memories (e.g., a FeRAM, an MRAM, or a PCM), and has a relatively low write energy compared to other non-volatile memories. Also, a STT-RAM has a high write endurance, a high density, and a high scalability. The lower level cache 120 may be referred to as a last-level cache, in which case the upper level cache 110 may be referred to as a lower-level cache. Also, the lower level cache 120 may be an exclusive cache that does not share any data with the upper level cache 110.

The lower level cache 120 forwards access information about the first data stored in the lower level cache 120 to the predictor 130. Access information about data is information indicating what type of access is performed on the data or other data in a predetermined set if the data is stored in the predetermined set in the lower level cache 120. Examples of accesses to data may be a hit or an evict. A hit in the lower level cache 120 indicates that data of the lower level cache 120 is forwarded to the upper level cache 110, and an evict in the lower level cache 120 indicates that data of the lower level cache 120 is forwarded to the main memory 140.

The predictor 130 predicts a reuse distance level of second data that has the same signature as the first data and is evicted from the upper level cache 110 based on the access information of the first data stored in the lower level cache 120. A reuse distance indicates a period of time taken until data stored in the lower level cache 120 is reused. For example, when a reuse distance is a near reuse distance level, a period of time taken until data stored in the lower level cache 120 is reused (hit or evicted) is relatively small, and when a reuse distance is a far reuse distance level, a period of time taken until data stored in the lower level cache 120 is reused is relatively great. Thus, a reuse distance level of data may also be considered to represent a likelihood that the data will be reused. A small reuse distance level indicates that the data is relatively more likely to be reused, and a large reuse distance level indicates that the data is relatively less likely to be reused. The predictor 130 predicts a reuse distance level of the second data based on the access information of the first data stored in the lower level cache 120 after the second data having the same signature as the first data is evicted from the upper level cache 110 and before the second data is stored. Thus, the predictor 130 may be considered to predict a likelihood that the second data will be reused based on the access information of the first data stored in the lower level cache 120.

In detail, first, the predictor 130 determines a reuse distance of the first data based on the access information of the first data stored in the lower level cache 120. The predictor 130 determines how many times access to other data in a predetermined set has occurred after data is stored in the predetermined set of the lower level cache 120 and before the stored data is accessed. For example, after data A is stored in a set of the lower level cache 120, and then a hit is generated with respect to data B in the set, and an evict is generated with respect to data C in the set, and a hit is generated with respect to the data A, the predictor 130 determines a reuse distance of the data A to be 2. A detailed example of the predictor 130 determining a reuse distance of the first data stored in the lower level cache 120 will be described later with reference to FIG. 7.

Next, the predictor 130 predicts a reuse distance level of the second data having the same signature as the first data based on the signature and the reuse distance of the first data. In other words, when it is determined that a period of time taken until the first data stored in the lower level cache 120 is reused (hit or evicted) is relatively great (that is, when the reuse distance of the first data is relatively great), the predictor 130 predicts the reuse distance of the second data having the same signature as the first data to be a far reuse distance level. On the other hand, when the reuse distance of the first data is relatively small, the predictor 130 predicts the reuse distance of the second data having the same signature as the first data to be a near reuse distance level.

When receiving a signature of the second data evicted from the upper level cache 110, the predictor 130 predicts a reuse distance level of the second data having the same signature as the first data. The predictor 130 predicts whether the second data evicted from the upper level cache 110 corresponds to a far reuse distance level or a near reuse distance level to determine whether to store the second data either in the lower level cache 120 or the main memory 140. For example, when a reuse distance of the second data evicted from the upper level cache 110 corresponds to a far reuse distance level, the predictor 130 determines to store the second data in the main memory 140 instead of in the lower level cache 120, and when the reuse distance of the second data corresponds to a near reuse distance level, the predictor 130 determines to store the second data in the lower level cache 120.

As described above, when data is evicted from the upper level cache 110, the processor 230 of the computing apparatus 100 predicts a reuse distance of the evicted data, stores data having a relatively small reuse distance in the lower level cache 120, and stores data having a relatively great reuse distance in the main memory 140, thereby reducing a standby power of the lower level cache 120.

Figure 3:
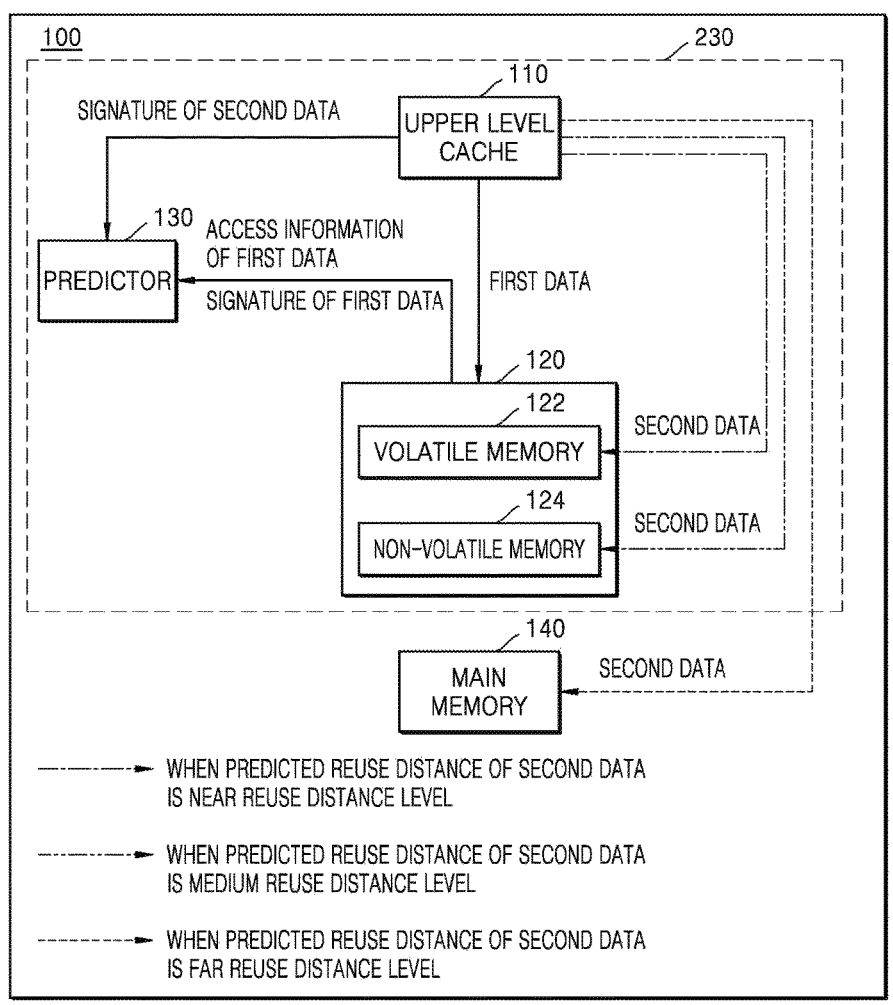
FIG. 3 illustrates another example of a computing apparatus.

FIG. 3 illustrates another example of a computing apparatus 100.

A lower level cache 120 included in a processor 230 is a hybrid cache including a volatile memory 122 and a non-volatile memory 124. The lower level cache 120 is configured so that the non-volatile memory 124 has a larger area than the volatile memory 122. For example, when a set of the lower level cache 120 includes sixteen blocks, one block may be a SRAM, which is the volatile memory 122, and fifteen blocks may be any of a STT-RAM, FeRAM, an MRAM, and a PCM, which are the non-volatile memory 124.

First data evicted from the upper level cache 110 is stored in the lower level cache 120, that is, in either the volatile memory 122 or the non-volatile memory 124.

The predictor 130 predicts a reuse distance of the second data that has the same signature as the first data and is evicted from the upper level cache 110 to be a far reuse distance level, a medium reuse distance level, or a near reuse distance level based on the signature and the reuse distance of the first data stored in the lower level cache 120.

The predictor 130 determines whether to store the evicted second data in the volatile memory 122, the non-volatile memory 124, or the main memory 140 based on the predicted reuse distance level of the second data. In detail, when a reuse distance of the second data evicted from the upper level cache 110 corresponds to a far reuse distance level, the predictor 130 determines to store the second data in the main memory 140. When the reuse distance of the second data corresponds to a medium reuse distance level, the predictor 130 determines to store the second data in the non-volatile memory 124. When the reuse distance of the second data corresponds to a near reuse distance level, the predictor 130 determines to store the second data in the volatile memory 122.

Accordingly, a standby power of the volatile memory 122 is reduced, and also write energy consumed by the non-volatile memory 124 is reduced by storing data having a relatively great reuse distance in the main memory 140 instead of in the non-volatile memory 124.

Figure 4:
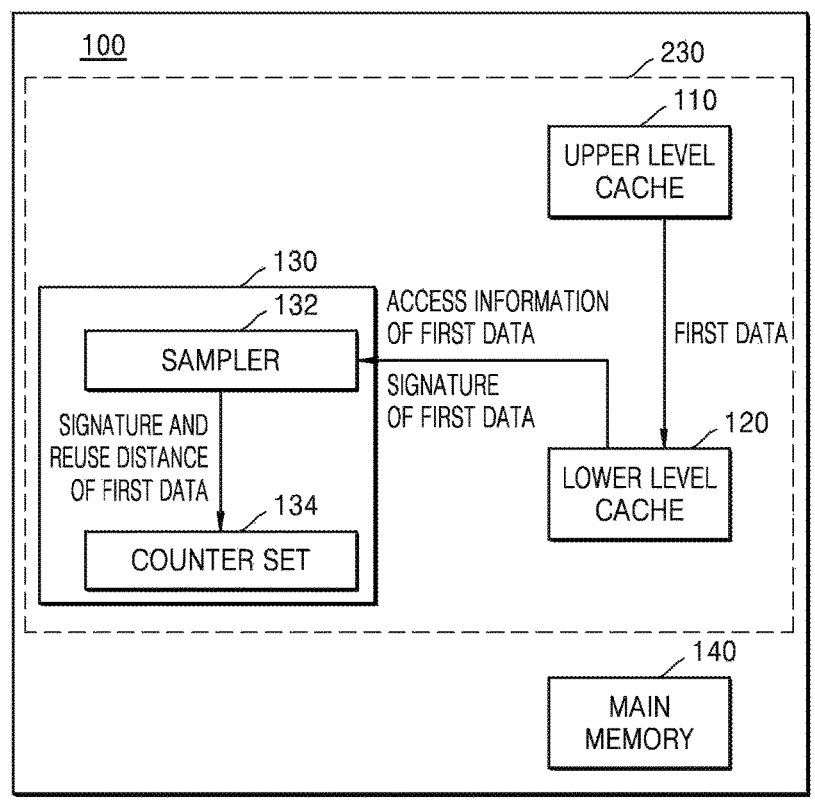
FIG. 4 illustrates a detailed example of a predictor.

FIG. 4 illustrates a detailed example of the predictor 130.

The predictor 130 includes a sampler 132 and a counter set 134.

The predictor 130 predicts a reuse distance level of data evicted from the upper level cache 110 based on a counter value included in the counter set 134 and corresponding to a signature of data stored in the lower level cache 120, and determines whether to store the evicted data in the lower level cache 120 or the main memory 140 based on the predicted reuse distance level of the evicted data. A detailed example of the predictor 130 that may be used when the lower level cache 120 is a hybrid cache including a volatile memory and a non-volatile memory will be described below with reference to FIG. 5.

The counter set 134 of the predictor 130 includes counters respectively corresponding to signatures. In one example, the counter set 134 includes a first counter and a second counter for each signature. For example, when a signature is the 13 least significant bits of a PC value, the counter set 134 includes a first counter and a second counter for each of 8192 signatures, which is 2 to the 13th power. In one example, each of the first and second counters consists of three bits and indicates a value from 0 (000) to 7 (111).

In one example, when the predictor 130 predicts a reuse distance level of data evicted from the upper level cache 110 using a first counter and a second counter corresponding to a signature of the data, the first counter indicates a degree of possibility that the reuse distance of the data is predicted to be a far reuse distance level, and the second counter indicates a degree of possibility that the reuse distance level of the data is predicted to be a near reuse distance level. In other words, when a value of the first counter is high, a possibility that the predicted reuse distance of the data corresponds to a far reuse distance level is high, and when a value of the second counter is high, a possibility that the predicted reuse distance of the data corresponds to a near reuse distance level is high. For example, when the value of the first counter is equal to or greater than a far reference value (for example, 4), the predictor 130 predicts a reuse distance of the data to be a far reuse distance level; when the value of the first counter is less than the far reference value, and the value of the second counter is equal to or greater than a near reference value (for example, 4), the predictor 130 predicts the reuse distance of the data to be a near reuse distance level; and when the value of the first counter is less than the far reference value, and the value of the second counter is less than the near reference value, the predictor 130 predicts a reuse distance of the data to be a medium reuse distance level.

Figure 5:
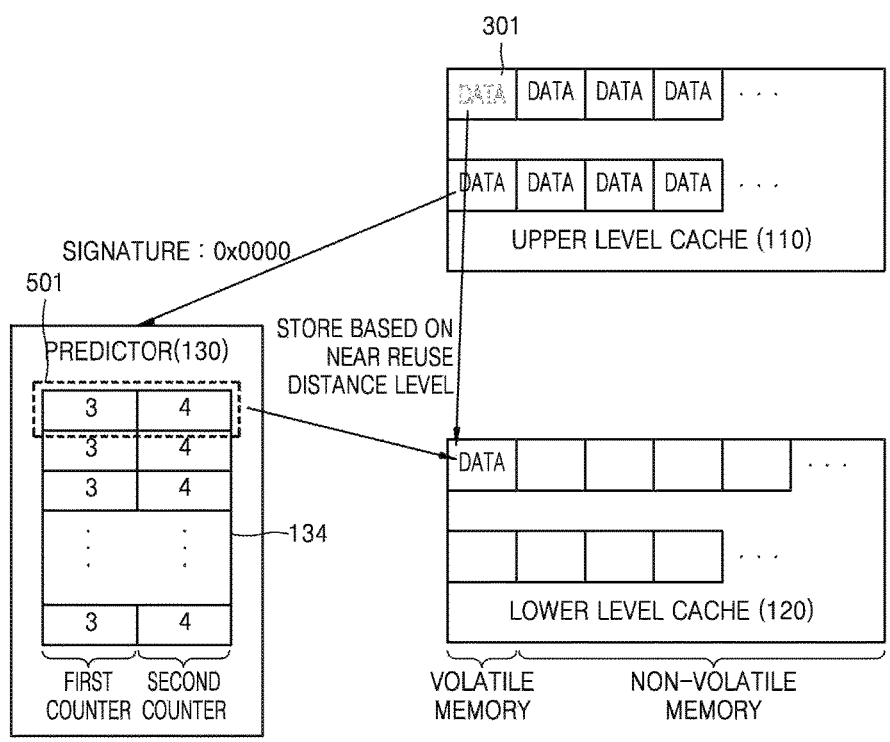
FIG. 5 illustrates an example in which a predictor stores data evicted from an upper level cache in a lower level cache.

FIG. 5 illustrates an example in which the predictor 130 stores data evicted from the upper level cache 110 in the lower level cache 120.

A process in which the first data 301 described as being stored in the lower level cache 120 is evicted from the upper level cache 110 to be stored will be described in detail below. When the first data 301 is evicted from the upper level cache 110, the predictor 130 determines, based on a signature 0x0000 of the first data 301 and the counter set 134, whether to store the first data 301 in the lower level cache 120 or the main memory 140. When a storage location is determined to be the lower level cache 120, the predictor 130 stores the first data 301 in a volatile memory or a non-volatile memory in the lower level cache 120. In detail, first, the predictor 130 predicts a reuse distance of the first data 301 to be a near reuse distance level by comparing values of a counter 501 including a first counter and a second counter corresponding to the signature 0x0000 of the first data 301 of the counter set 134 with respective reference values. For example, the value 3 of the first counter is less than a far reference value of 4, and the value 4 of the second counter is equal to or greater than a near reference value of 4, so the predictor 130 determines a reuse distance of the first data 301 to be a near reuse distance level. Accordingly, the predictor 130 determines to store the first data 301 in the volatile memory of the lower level cache 120. Although initial values of the first counter and the second counter of the counter set 134 are respectively set to 3 and 4 in this example, the initial values of the first and second counters may also be set to other values.

Referring to FIG. 4 again, when the first data 301 is stored in a sampling set of the lower level cache 120, the sampler 132 determines a reuse distance of the first data 301 based on the signature and the access information of the first data 301. A portion of the lower level cache 120 may be selected as a sampling set. For example, some of a plurality of rows of the lower level cache 120 may be selected as a sampling set. In detail, for example, the computing apparatus 100 may set only ⅟32 of all regions of the lower level cache 120 as a sampling set.

In detail, when the first data 301 stored in the lower level cache 120 is stored in a sampling set of the lower level cache 120, the sampler 132 receives the signature of the first data 301 from the lower level cache 120. In addition, the sampler 132 receives the access information about the first data 301 from the lower level cache 120. For example, the lower level cache 120 forwards, to the sampler 132, information indicating that access to other data in the sampling set has occurred after the first data 301 is stored in the sampling set and before access to the first data 301 (for example, a hit or an evict) has occurred.

Next, the sampler 132 determines a reuse distance of the first data 301 based on the access information about the first data stored in the sampling set. The sampler 132 stores the signature and the reuse distance of the first data 301 according to a location of the first data 301 stored in the sampling set. For example, when the first data 301 is stored in a first block of the sampling set, the sampler 132 stores the signature and the reuse distance of the first data 301 in a first block of a predetermined set. The sampler 132 is implemented as hardware.

Figure 6:
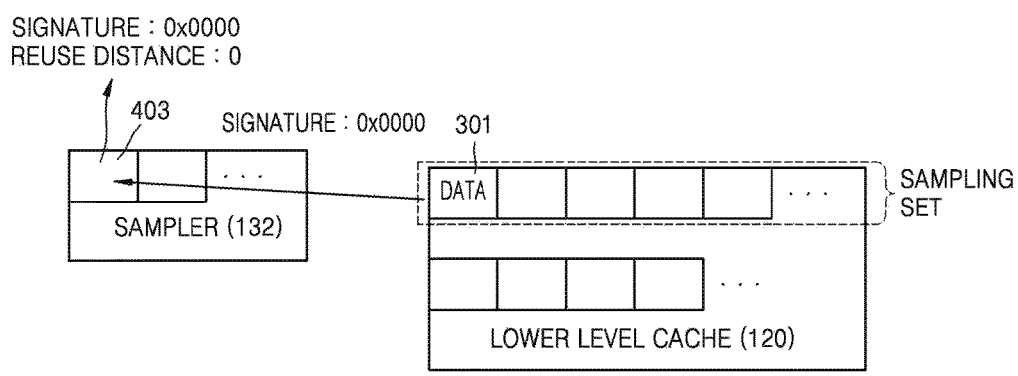
FIG. 6 illustrates an example in which a signature and access information of data stored in a sampling set of a lower level cache are forwarded to a sampler.

FIG. 6 illustrates an example in which a signature and access information of data stored in a sampling set of a lower level cache are forwarded to a sampler.

As illustrated in FIG. 6, the first data 301 is stored in a first block in the sampling set of the lower level cache 120. While the sampling set is illustrated as being a set in an uppermost row of the lower level cache 120, the sampling set may also be two or more sets at another position.

The lower level cache 120 forwards the signature 0x0000 of the first data 301 to the sampler 132, and the sampler 132 stores a reuse distance corresponding to the signature 0x0000 in a first block 403 together with the signature 0x0000. The sampler 132 sets an initial value of a reuse distance corresponding to the signature 0x0000 to 0.

Figure 7:
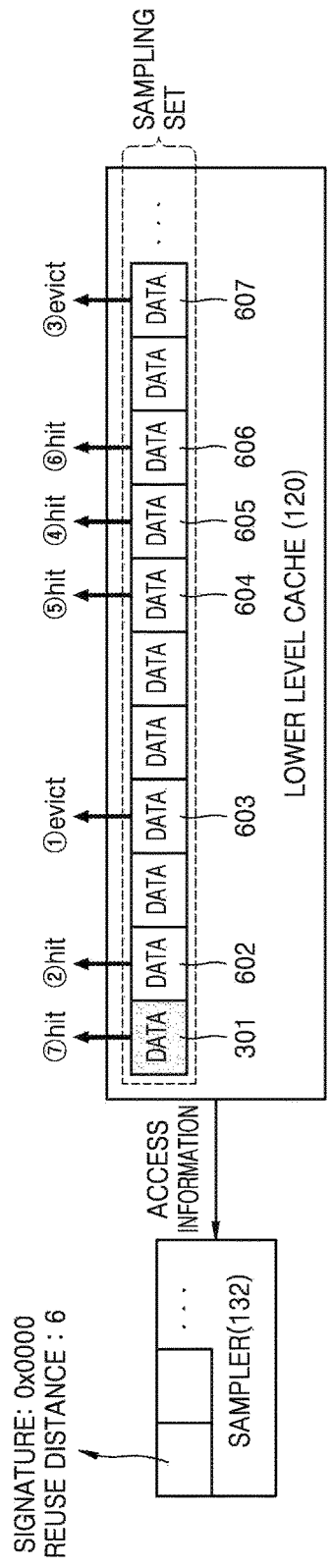
FIG. 7 illustrates an example in which a sampler determines a reuse distance of data stored in a lower level cache based on access information of the data stored in the lower level cache.

FIG. 7 illustrates an example in which the sampler determines a reuse distance of data stored in the lower level cache based on access information of the data stored in the lower level cache.

As described above with reference to FIG. 5, the first data 301 of the upper level cache 110 is stored in the lower level cache 120, and a storage location of the first data 301 is included in a sampling set. Pieces of data stored in the sampling set each have a signature, and the signatures may be different from one another, or some of the signatures may be the same. Hereinafter, for convenience of description, it will be assumed that only data 301, 602, 603, 604, 605, 606, and 607 among data of the sampling set have different signatures.

As illustrated in FIG. 7, when an evict on the data 603 is generated after the first data 301 is stored in the sampling set, the lower level cache 120 forwards to the sampler 132 information indicating that the evict on the data 603 is generated. Next, the sampler 132 increases a reuse distance of data included in the sampling set and having a different signature from the signature of the data 603 by 1. In detail, reuse distances of the data 301, 602, 604, 605, 606, and 607 excluding the data 603 are increased by 1. That is, the sampler 132 increases a reuse distance of blocks not corresponding to the signature of the data 603 by 1. Thus, the sampler 132 updates a reuse distance regarding the signature 0x0000 from 0 to 1 based on access information about the data 603 having a signature that is different from the signature 0x0000 of the first data 301.

Next, when a hit is generated on the data 602, the lower level cache 120 forwards to the sampler 132 information indicating that the hit on the data 602 is generated, and the sampler 132 increases a reuse distance of blocks not corresponding to a signature of the data 602 by 1. Accordingly, the sampler 132 updates a reuse distance with respect to the signature 0x0000 from 1 to 2 based on access information about the data 602 having a signature that is different from the signature 0x0000 of the first data 301. Likewise, when, in sequential order, an evict on the data 607 is generated, then a hit on the data 605 is generated, then a hit on the data 604 is generated, and then a hit on the data 606 is generated, the lower level cache 120 sequentially forwards access information about the data 607, the data 605, the data 604, and the data 606, which have signatures that are different from the signature 0x0000, to the sampler 132, and the sampler 132 sequentially updates the reuse distance corresponding to the signature 0x0000 from 2 to 6.

Next, when a hit on the first data 301 of the lower level cache 120 is generated, the first data 301 is forwarded from the lower level cache 120. Information indicating that the hit is generated on the first data 301 having the signature 0x0000 is forwarded to the sampler 132, and the sampler 132 increases the reuse distance of blocks having a different signature from the signature 0x0000 by 1, and the reuse distance corresponding to the signature 0x0000 is maintained as 6. When a hit or an evict is sequentially generated on the data 603, 602, 607, 605, 604, and 606, the data is forwarded from the lower level cache 120 and stored in the upper level cache 110 or the main memory 140, but a detailed description thereof has been omitted for convenience of description.

When, instead of a hit being generated on the first data 301 as illustrated in FIG. 7, an evict is generated on the first data 301, the sampler 132 determines a reuse distance corresponding to the signature 0x0000 to be infinity based on information indicating that the evict on the first data 301 is generated. That is, when data stored in the lower level cache 120 is evicted to the main memory 140, the evicted data is less likely to be reused, and thus the sampler 132 determines a reuse distance of the data evicted to the main memory 140 to be infinity.

Referring to FIG. 4 again, the predictor 130 updates the counter set 134 using the signature and the reuse distance from the sampler 132. The counter set 134 is updated when data belonging to a sampling set of the lower level cache 120 is hit or evicted to be forwarded. That is, when first data of the lower level cache 120 is hit or evicted, the predictor 130 updates a value of a counter among the counter set 134 corresponding to the signature of the first data using the signature and the reuse distance of the first data. As described above, when an evict is generated on the first data, a reuse distance of the first data is set to infinity ($\infty$), and when a hit is generated on the first data, a reuse distance corresponding to the signature of the first data stored in the sampler 132 is used to update a counter value. The predictor 130 cumulatively updates the counter set 134, and predicts a reuse distance of data evicted from the upper level cache 110 based on the counter set 134 that is cumulatively updated.

When a hit or an evict is generated on the first data included in the sampling set of the lower level cache 120, the predictor 130 compares the reuse distance of the first data stored in the sampler 132 with a predetermined threshold value to update a counter value corresponding to the signature of the first data included in the counter set 134. For example, if a hit is generated on the first data, and a reuse distance of the first data is 6, the predictor 130 compares the reuse distance of 6 with a threshold value to increase or decrease a counter value corresponding to the signature of the first data. When an evict is generated on the first data, a reuse distance of the first data is set to infinity ($\infty$) and is compared with a threshold value.

The predictor 130 predicts a reuse distance level of the second data having the same signature as the first data based on the counter set 134 updated as described above. As illustrated in FIG. 1, the predictor 130 predicts whether the reuse distance of the second data having the same signature as the first data corresponds to a far reuse distance level or a near reuse distance level based on an updated counter value corresponding to the signature of the first data. Alternatively, as illustrated in FIG. 3, the predictor 130 predicts whether the reuse distance of the second data having the same signature as the first data corresponds to a far reuse distance level, a near reuse distance level, or a medium reuse distance level based on updated values of the first counter and the second counter. For example, when an updated value of the first counter is equal to or greater than a far reference value (for example, 4), the predictor 130 predicts a reuse distance of the second data to be a far reuse distance level, and when an updated value of the first counter is less than the far reference value, and an updated value of the second counter is equal to or greater than a near reference value (for example, 4), the predictor 130 predicts the reuse distance of the second data to be a near reuse distance level. When an updated value of the first counter is less than the far reference value, and an updated value of the second counter is less than the near reference value, the predictor 130 predicts the reuse distance of the second data to be a medium reuse distance level.

Figure 8:
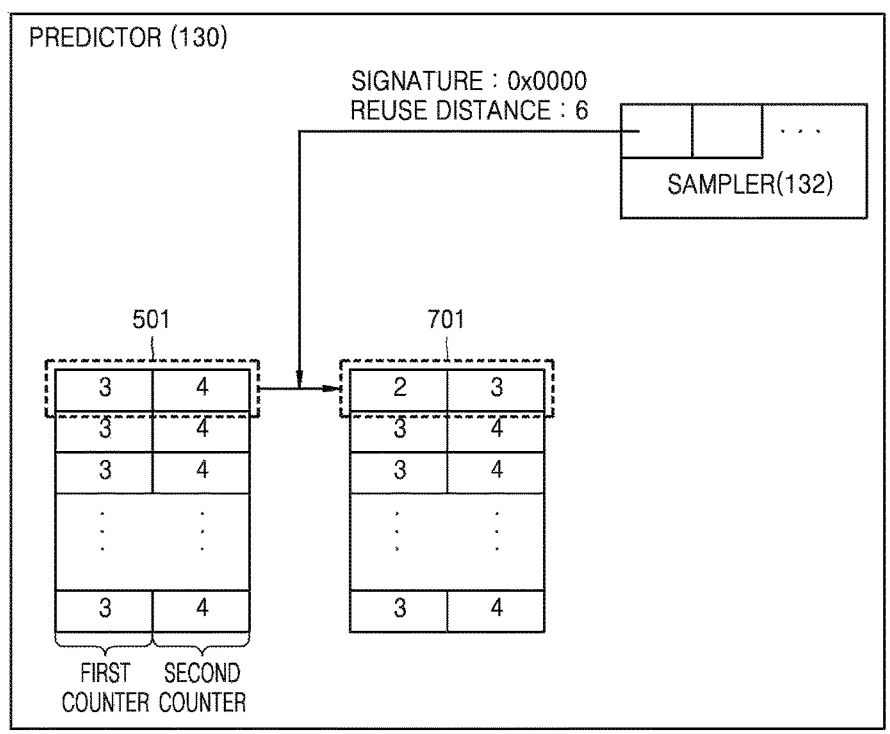
FIG. 8 illustrates an example in which a counter used to predict a reuse distance is updated.

FIG. 8 illustrates an example in which a counter used to predict a reuse distance is updated.

As described above, a counter is updated when data belonging to a sampling set of a lower level cache is hit or evicted to be forwarded.

The predictor 130 updates the counter 501 corresponding to the signature 0x0000 to a counter 701 based on the reuse distance of 6 corresponding to the signature 0x0000 determined by the sampler 132.

The predictor 130 compares the reuse distance of 6 corresponding to the signature 0x0000 with a first threshold value (a far threshold value) and a second threshold value (a near threshold value) to update the counter 501. For example, a first threshold value of a first counter indicating a possibility of a far reuse distance may be, for example, infinity, which is a relatively large value, and a second threshold value of a second counter indicating a possibility of a near reuse distance may be 1, which is a relatively small value. When a reuse distance is equal to or greater than the first threshold value, the predictor 130 increases a value of the first counter by 1, and when the reuse distance is less than the first threshold value, the predictor 130 decreases a value of the first counter by 1. On the other hand, when the reuse distance is equal to or greater than the second threshold value, the predictor 130 decreases a value of the second counter by 1, and when the reuse distance is less than the second threshold value, the predictor 130 increases a value of the second counter by 1. In the example of FIG. 8, since the reuse distance of 6 is less than the first threshold value of infinity, the predictor 130 decreases the value of the first counter of the counter 501 from 3 to 2, and since the reuse distance of 6 is greater than the second threshold value of 1, the predictor 130 decreases the value of the second counter of the counter 501 from 4 to 3. That is, since the reuse distance of 6 is less than the first threshold value of infinity, the predictor 130 decreases the value of the first counter from 3 to 2 to decrease a possibility that data having the signature 0x0000 is predicted to have a far reuse distance level. Also, since the reuse distance of 6 is greater than the second threshold value of 1, the predictor 130 decreases the value of the second counter from 4 to 3 to decrease a possibility that data having the signature 0x0000 is predicted to have a near reuse distance level.

However, if an evict is generated on the first data 301, rather than a hit as illustrated in FIG. 7, the predictor 130 sets a reuse distance to infinity as described above. In this case, since the reuse distance is the same as the first threshold value of infinity, the value of the first counter is increased from 3 to 4, and since the reuse distance is greater than the second threshold value of 1, the value of the second counter is decreased from 4 to 3. Accordingly, a value of the counter 701 updated to (2, 3) when a hit is generated is updated to (4, 3) when an evict is generated. The predictor 130 predicts a reuse distance level of data having the signature 0x0000 using the updated counter values corresponding to the signature 0x0000, that is, 2, which is the value of the first counter, and 3, which is the value of the second counter. When a far reference value and a near reference value are each 4 as described above, the counter values (2,3) are predicted to be a medium reuse distance level, and the counter values (4,3) are predicted to be a far reuse distance level.

Figure 9:
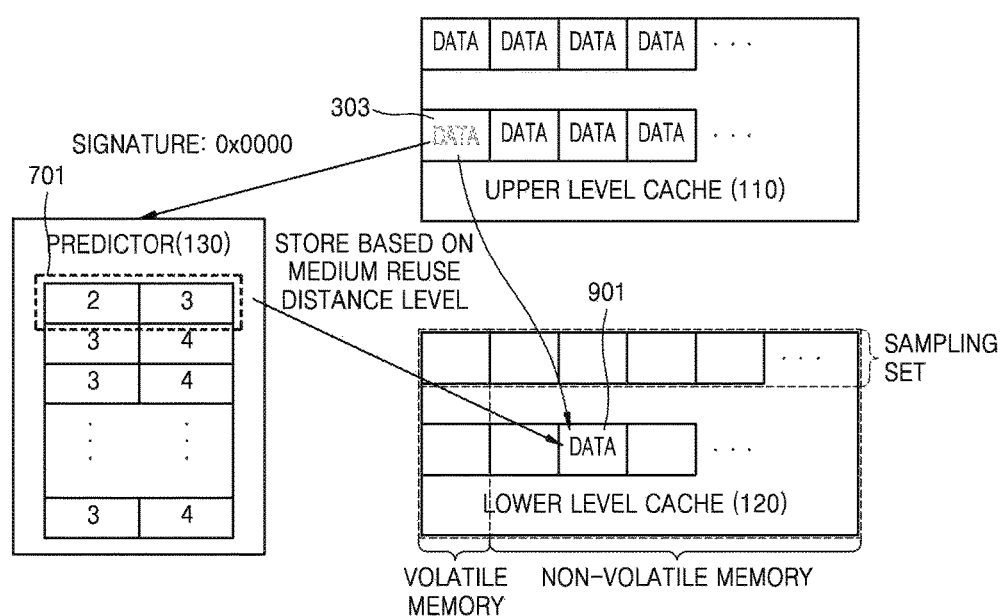
FIG. 9 illustrates an example in which a predictor predicts a reuse distance of data evicted from an upper level cache and stores the data in a non-volatile memory of a lower level cache.

FIG. 9 illustrates an example in which the predictor 130 predicts a reuse distance of data evicted from an upper level cache and stores the data in a non-volatile memory of a lower level cache.

The predictor 130 predicts a reuse distance level of the second data 303 evicted from the upper level cache 110 and has a signature 0x0000 based on the value 2 of the first counter and the value 3 of the second counter of the counter 701 including the first and second counters and corresponding to the signature 0x0000. In detail, since the value 2 of the first counter 701 is less than 4, and the value 3 of the second counter is less than 4, the predictor 130 predicts a reuse distance of the second data 303 having the signature 0x0000 to be a medium reuse distance level.

Accordingly, the predictor 130 determines to store the second data 303 determined to have a medium reuse distance level in a block 901 in a non-volatile memory region in the lower level cache 120.

However, when the value of the first counter and the value of the second counter are 4 and 3, respectively, rather than 2 and 3, respectively, as illustrated in FIG. 9, a reuse distance with respect to the second data 303 is predicted to be a far reuse distance level, and thus the second data 303 is stored in the main memory 140. As described above, when a reuse distance of data evicted from the upper level cache 110 is predicted to be a far reuse distance level, the data is stored in the main memory 140. However, if free space exists in the lower level cache 120, evicted data may be stored in the lower level cache 120 instead of in the main memory 140.

Figure 10:
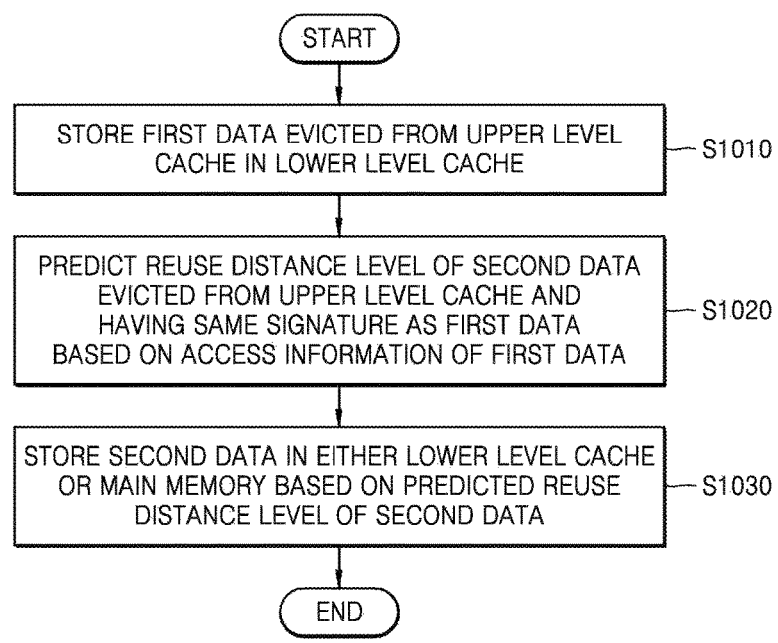
FIG. 10 is a diagram for explaining an example of a method of managing a cache performed by a computing apparatus.

FIG. 10 is a diagram for explaining an example of a method of managing a cache performed by a computing apparatus.

The method illustrated in FIG. 10 may be performed by the computing apparatus 100 of FIG. 1, 3, or 4, and a repeated description thereof has been omitted.

In operation S1010, the computing apparatus 100 stores first data evicted from an upper level cache in a lower level cache, and the first data is stored in a sampling set of the lower level cache according to an address value of the first data.

In operation S1020, the computing apparatus 100 predicts a reuse distance level of second data evicted from the upper level cache and has the same signature as the first data based on access information of the first data stored in the sampling set of the lower level cache. In detail, the computing apparatus 100 determines a reuse distance of the first data based on access information of the first data. Also, the computing apparatus 100 stores a signature and the reuse distance of the first data together. The computing apparatus 100 predicts a reuse distance level of the second data having the same signature as the first data based on the signature and the reuse distance of the first data.

In operation S1030, the computing apparatus 100 stores the second data evicted from the upper level cache in either the lower level cache or the main memory based on the reuse distance level predicted in operation S1020. When the lower level cache includes both a volatile memory and a non-volatile memory, the computing apparatus 100 stores the second data in one of the volatile memory of the lower level cache, the non-volatile memory of the lower level cache, and the main memory based on the predicted reuse distance level of the second data.

Figure 11:
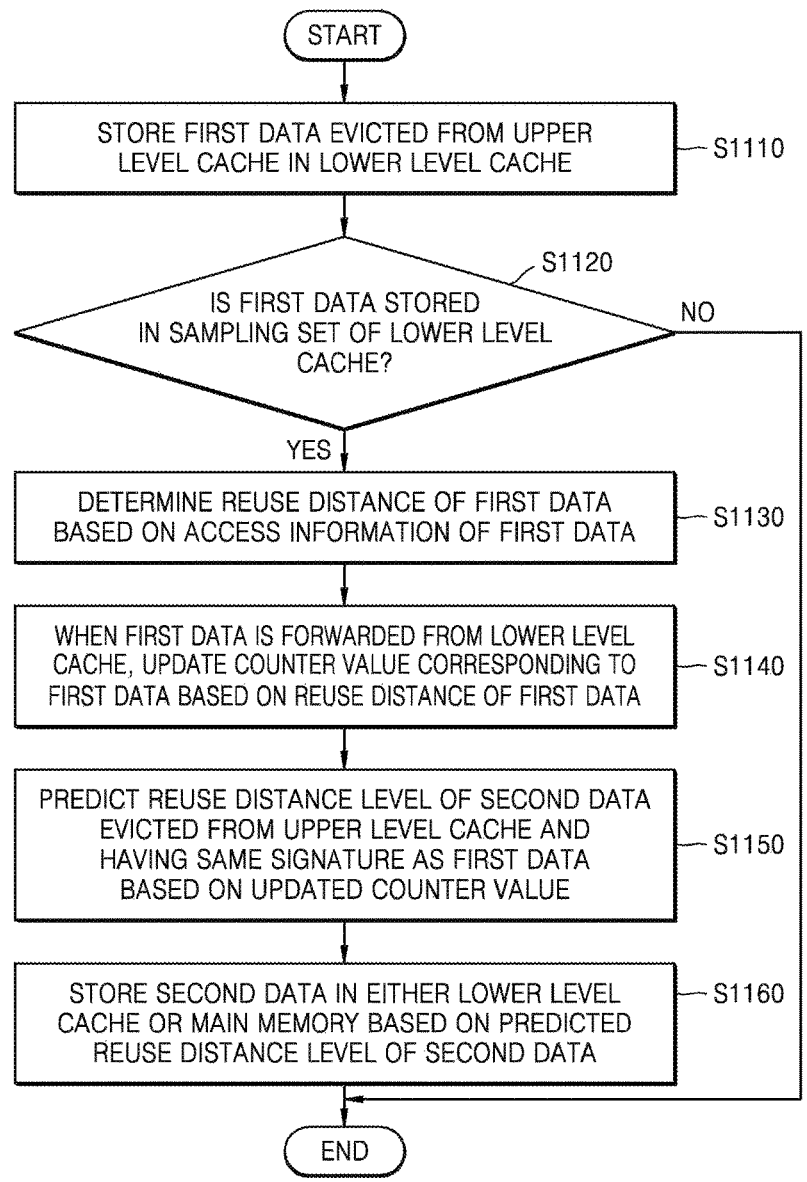
FIG. 11 is a diagram for explaining another example of a method of managing a cache performed by a computing apparatus.

FIG. 11 is a diagram for explaining another example of a method of managing a cache performed by a computing apparatus.

The method illustrated in FIG. 11 may be performed by the computing apparatus 100 of FIG. 1, 3, or 4, and a repeated description thereof has been omitted.

In operation S1110, he computing apparatus 100 stores first data evicted from the upper level cache in the lower level cache.

In operation S1120, the computing apparatus 100 determines whether the first data stored in the lower level cache is stored in a sampling set of the lower level cache. That is, the computing apparatus 100 determines whether an address value of the first data corresponds to a sampling set of the lower level cache. When the first data is determined to be not stored in the sampling set in operation S1120, the method ends.

In operation S1130, when the first data is determined to be stored in the sampling set in operation S1120, the computing apparatus 100 determines a reuse distance of the first data based on access information of the first data. In detail, the computing apparatus 100 determines the reuse distance of the first data based on hit or evict information about data stored in the sampling set and having signatures that are different from the signature of the first data. Also, the computing apparatus 100 stores both a signature and the reuse distance of the first data.

In operation S1140, the computing apparatus 100 updates a counter value corresponding to the signature of the first data based on the reuse distance of the first data when a hit or an evict is generated on the first data so that the first data is forwarded from the lower level cache. In detail, the computing apparatus 100 updates a counter value corresponding to the signature of the first data based on a result of comparing the reuse distance of the first data with a predetermined threshold value.

In operation S1150, the computing apparatus 100 predicts a reuse distance level of second data evicted from the upper level cache and having the same signature as the first data based on the updated counter value. When the computing apparatus 100 includes a lower level cache including only a non-volatile memory, the computing apparatus 100 predicts, based on the updated counter value, whether the reuse distance of the second data having the same signature as the first data corresponds to a far reuse distance level or a near reuse distance level. Alternatively, when the computing apparatus 100 includes a hybrid lower level cache including a volatile memory and a non-volatile memory, the computing apparatus 100 predicts, based on the updated counter value, whether the reuse distance of the second data having the same signature as the first data corresponds to a far reuse distance level, a near reuse distance level, or a medium reuse distance level.

In operation S1160, based on the predicted reuse distance level of the second data, the computing apparatus 100 stores the second data evicted from the upper level cache in either the lower level cache or the main memory. When the predicted reuse distance of the second data corresponds to a far reuse distance level, the computing apparatus 100 stores the second data in the main memory, and when the predicted reuse distance of the second data corresponds to a near reuse distance level, the computing apparatus 100 stores the second data in the lower level cache.

When the lower level cache is a hybrid cache, the computing apparatus 100 stores the second data in one of the volatile memory of the lower level cache, the non-volatile memory of the lower level cache, and the main memory based on the predicted reuse distance level of the second data. When the predicted reuse distance of the second data corresponds to a far reuse distance level, the computing apparatus 100 stores the second data in the main memory, when the predicted reuse distance of the second data corresponds to a medium reuse distance level, the computing apparatus 100 stores the second data in the non-volatile memory of the lower level cache, and when the predicted reuse distance of the second data corresponds to a near reuse distance level, the computing apparatus 100 stores the second data in the volatile memory of the lower level cache.

Figure 12:
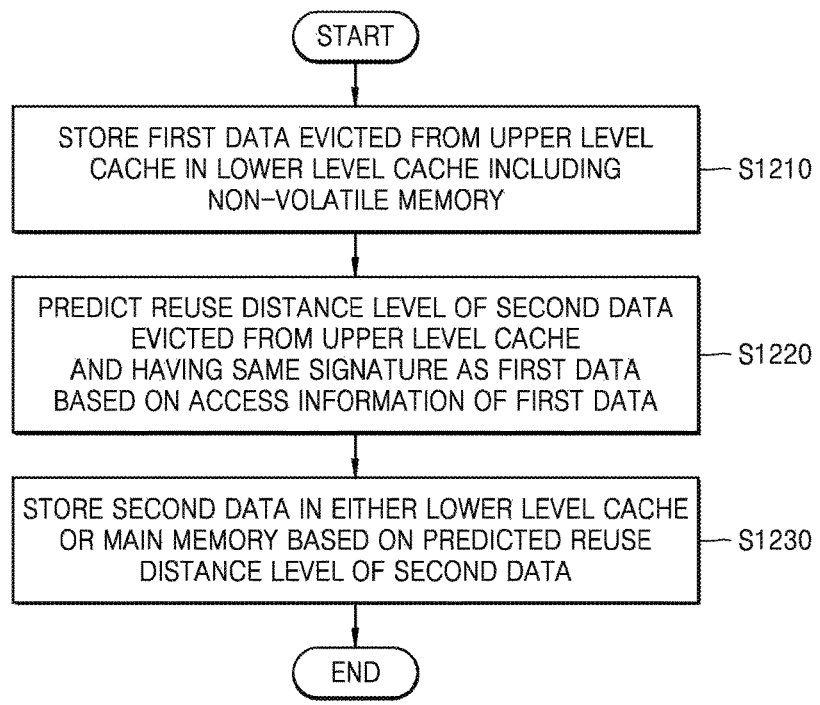
FIG. 12 is a diagram for explaining another example of a method of managing a cache performed by a computing apparatus.

FIG. 12 is a diagram for explaining another example of a method of managing a cache performed by a computing apparatus.

The method illustrated in FIG. 12 may be performed by the computing apparatus 100 of FIG. 1, 3, or 4, and a repeated description thereof has been omitted.

In operation S1210, the computing apparatus 100 stores first data evicted from an upper level cache in a lower level cache including a non-volatile memory.

In operation S1220, the computing apparatus 100 predicts a reuse distance level of second data evicted from the upper level cache and having the same signature as the first data based on access information of the first data. The computing apparatus 100 determines a reuse distance of the first data based on the access information of the first data. Also, the computing apparatus 100 stores a signature and the reuse distance of the first data. The predictor 130 predicts the reuse distance level of the second data having the same signature as the first data based on the signature and the reuse distance of the first data.

In operation S1230, the computing apparatus 100 stores the second data in either the lower level cache or a main memory based on the reuse distance level of the second data predicted in operation S1220. When the lower level cache is a hybrid cache, the computing apparatus 100 stores the second data in one of a volatile memory of the lower level cache, the non-volatile memory of the lower level cache, and the main memory based on the predicted reuse distance level of the second data.

Figure 13:
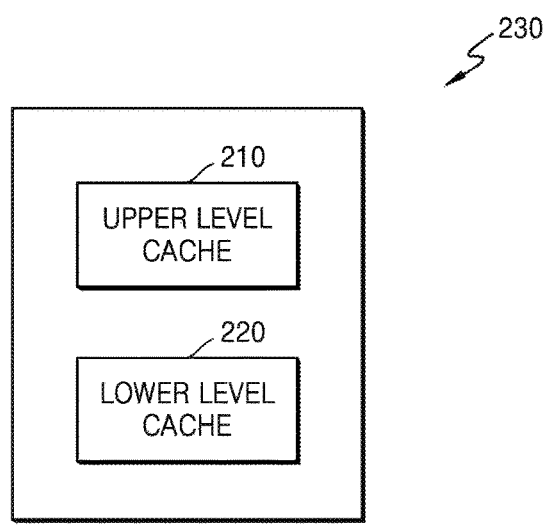
FIG. 13 illustrates an example of a processor.

FIG. 13 illustrates an example of a processor 230.

The processor 230 includes an upper level cache 210 and a lower level cache 220. Only elements of the processor 230 that are related to this example are illustrated in FIG. 13. It will be apparent to one of ordinary skill in the art that the processor 230 may also include general-purpose elements in addition to the elements illustrated in FIG. 13.

The upper level cache 210 and the lower level cache 220 store data. For example, the lower level cache 220 stores data evicted from the upper level cache 210.

The lower level cache 220 includes a non-volatile memory, and the lower level cache 220 does not share any data with the upper level cache 210. The lower level cache 220 may include only a non-volatile memory, or may include both a non-volatile memory and a volatile memory, and the lower level cache 220 is an exclusive cache that does not share any data with the upper level cache 210.

Examples of the non-volatile memory included in the lower level cache 220 include a STT-RAM, a FeRAM, a MRAM, and a PCM.

The computing apparatus 100, the upper level cache 110, the lower level cache 120, the volatile memory 122, the non-volatile memory 124, the predictor 130, the sampler 132, the counter set 134, the first counter, the second counter, the counters 501 and 701, the main memory 140, the upper level cache 210, the lower level cache 220, and the processor 230 illustrated in FIGS. 1-9 and 13 that perform the operations described herein with respect to FIGS. 1-13 are implemented by hardware components. Examples of hardware components include controllers, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-13. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 10-12 that perform the operations described herein with respect to FIGS. 1-13 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

The particular implementations shown and described herein are merely examples, and are not intended to limit the scope of the claim in any way. For the sake of brevity, conventional electronics, control systems, and other functional aspects of the systems and components of the individual operating components of the systems may not be described in detail. Furthermore, the connecting lines shown in the various figures are intended to represent examples of functional relationships, physical couplings, and logical couplings between the various elements. However, many alternative or additional functional relationships, physical connections, and logical connections between the various elements may be present in a practical device.

The use of the terms "a," "an," and "the" and similar terms in the in the descriptions of the examples and in the claims are to be construed to cover both the singular and the plural. Furthermore, any recitation of ranges of values herein are merely intended to serve as a shorthand method of referring individually to each separate value falling within the range, unless otherwise indicated herein, and each separate value is incorporated into the specification as if it were individually recited herein.

While this disclosure includes specific examples, it will be apparent to one of ordinary skill in the art that various changes in form and details may be made in these examples without departing from the spirit and the scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of managing a cache, the method comprising:
   storing first data of an upper level cache in a lower level cache; and
   when evicting, from the upper level cache, second data having a same signature as the first data,
     predicting a reuse distance level of the second data based on access information about the first data,
     selecting, as a storage location, one of the lower level cache and a main memory based on the predicted reuse distance level of the second data, and
     storing the second data in the selected storage location,
   wherein the predicting of the reuse distance level of the second data comprises:
     determining a reuse distance of the first data based on the access information about the first data;
     comparing the determined reuse distance of the first data with a predetermined threshold value;
     updating a counter value corresponding to a signature of the first data based on a result of the comparing; and
     predicting the reuse distance level of the second data based on the updated counter value.

2. The method of claim 1, wherein the lower level cache comprises
   a volatile memory and a non-volatile memory; and
   the storing of the second data comprises storing the second data in one of the volatile memory, the non-volatile memory, and the main memory based on the predicted reuse distance level of the second data.

3. The method of claim 1, wherein the lower level cache is an exclusive cache that does not share any data with the upper level cache.

4. The method of claim 1, wherein the storing of the first data comprises storing the first data in a sampling set corresponding to a portion of the lower level cache; and
   the determining of a reuse distance of the first data comprises determining a reuse distance of the first data based on a number of times at least one piece of data stored in the sampling set is accessed.

5. The method of claim 1, wherein the storing of the first data comprises storing the first data in a sampling set corresponding to a portion of the lower level cache; and
   the predicting comprises storing the access information about the first data.

6. The method of claim 1, wherein the lower level cache comprises a non-volatile memory, and does not comprise a volatile memory.

7. The method of claim 6, wherein the non-volatile memory is a spin-transfer torque random-access memory (STT-RAM).

8. A non-transitory computer-readable storage medium storing instructions for causing computing hardware to perform the method of claim 1.

9. A computing apparatus comprising:
   an upper level cache;
   a lower level cache configured to store first data evicted from the upper level cache;
   a main memory; and
   a predictor configured to predict a reuse distance level of second data having a same signature as the first data based on access information about the first data, and determine whether to store the second data in the lower level cache or a main memory based on the predicted reuse distance level of the second data;

wherein the predictor comprises a sampler configured to determine a reuse distance of the first data based on the access information about the first data; and the predictor is further configured to compare the determined reuse distance of the first data with a predetermined threshold value, update a counter value corresponding to a signature of the first data based on a result of the comparing, and predict the reuse distance level of the second data based on the updated counter value.

10. The computing apparatus of claim 9, wherein the lower level cache comprises a volatile memory and a non-volatile memory; and the predictor is further configured to determine whether to store the second data in the volatile memory, the non-volatile memory, or the main memory based on the predicted reuse distance level of the second data.

11. The computing apparatus of claim 9, wherein the lower level cache is an exclusive cache that does not share any data with the upper level cache.

12. The computing apparatus of claim 9, wherein the lower level cache is further configured to store the first data in a sampling set corresponding to a portion of the lower level cache; and the sampler is further configured to determine a reuse distance of the first data based on a number of times at least one piece of data stored in the sampling set is accessed.

13. The computing apparatus of claim 9, wherein the lower level cache is further configured to store the first data in a sampling set corresponding to a portion of the lower level cache; and the predictor is further configured to store the access information about the first data.

14. The computing apparatus of claim 9, wherein the lower level cache comprises a non-volatile memory, and does not comprise a volatile memory.

15. The computing apparatus of claim 14, wherein the non-volatile memory is a spin-transfer torque random-access memory (STT-RAM).

16. A method of managing a cache, the method comprising:

storing first data evicted from an upper level cache in a lower level cache comprising a non-volatile memory;

predicting a reuse distance level of second data evicted from the upper level cache based on access information about the first data; and storing the second data in one of the lower level cache and a main memory based on the predicted reuse distance level of the second data, wherein the predicting of the reuse distance level of the second data comprises:

determining a reuse distance of the first data based on the access information about the first data;

comparing the determined reuse distance of the first data with a predetermined threshold value;

updating a counter value corresponding to a signature of the first data based on a result of the comparing; and predicting the reuse distance level of the second data based on the updated counter value.

17. The method of claim 16, wherein the lower level cache further comprises a volatile memory; and the storing of the second data comprises storing the second data in one of the volatile memory, the non-volatile memory, and the main memory based on the predicted reuse distance level of the second data.

18. The method of claim 16, wherein the lower level cache is an exclusive cache that does not share any data with the upper level cache.

19. The method of claim 16, wherein the first data and the second data have a same signature.

20. The method of claim 16, wherein the non-volatile memory is a spin-transfer torque random-access memory (STT-RAM).

21. A processor comprising:

an upper level cache configured to store data;

a lower level cache comprising a non-volatile memory; and a predictor configured to determine whether to store data evicted from the upper level cache in the lower level cache or main memory, wherein the lower level cache is an exclusive cache that does not share any data with the upper level cache, wherein the predictor comprises a sampler configured to determine a reuse distance of data stored in the lower level cache based on access information about the data stored in the lower level cache, wherein the predictor further comprises a counter; and the predictor is further configured to compare the determined reuse distance of the data stored in the lower level cache with a predetermined threshold value, update the counter based on a result of the comparing, predict a reuse distance level of the data evicted from the upper level cache based on the updated counter in response to the data evicted from the upper level cache and the data stored in the lower level cache having a same signature, and determine whether to store the data evicted from the upper level cache in the lower level cache or the main memory based on the predicted reuse distance level of the data evicted from the upper level cache.

22. The processor of claim 21, wherein the non-volatile memory is a spin-transfer torque random-access memory (STT-RAM).

23. The processor of claim 21, wherein the lower level cache further comprises a volatile memory.

* * * * *